United States Patent
Fitch (10) Patent No.: US 8,296,754 B2
(45) Date of Patent: Oct. 23, 2012

(54) INDICIA READER WITH PROGRAMMABLE INDICATORS OF SOFTWARE UPGRADES

(75) Inventor: Timothy R. Fitch, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 813 days.

(21) Appl. No.: 12/476,766

(22) Filed: Jun. 2, 2009

(65) Prior Publication Data

US 2010/0306755 A1    Dec. 2, 2010

(51) Int. Cl.
*G06F 9/44*    (2006.01)
*G06K 7/01*    (2006.01)

(52) U.S. Cl. ......... 717/168; 717/126; 235/435; 235/454

(58) Field of Classification Search .................. 717/168; 235/454
See application file for complete search history.

(56) References Cited

U.S. PATENT DOCUMENTS

| 7,383,998 B2 | 6/2008 | Parker et al. |
| 7,552,863 B2 * | 6/2009 | Koziol et al. ................. 235/375 |
| 2003/0029917 A1 | 2/2003 | Hennick et al. |
| 2008/0209411 A1 | 8/2008 | Koziol et al. |
| 2009/0044003 A1 | 2/2009 | Berthiaume et al. |

FOREIGN PATENT DOCUMENTS

| EP | 0675648 A2 | 10/1995 |
| EP | 1909490 A2 | 4/2008 |
| WO | W09944360 A1 | 9/1999 |

OTHER PUBLICATIONS

European Search Report of corresponding European Patent Application No. 10164410.2-1243, dated Sep. 17, 2010, 3 pages.

* cited by examiner

*Primary Examiner* — Don Wong
*Assistant Examiner* — Deric Ortiz
(74) *Attorney, Agent, or Firm* — Hiscock & Barclay, LLP (57) ABSTRACT

An indicia reader with a user perceptible indicator of a software upgrade having an imaging reader assembly, an electronics assembly, a housing, wherein one of the electronics assembly and the housing produces a user perceptible indicator in response to a software upgrade.

14 Claims, 6 Drawing Sheets

INDICIA READER WITH PROGRAMMABLE INDICATORS OF SOFTWARE UPGRADES

FIELD OF THE INVENTION

The present invention relates to indicia reading devices, and more particularly to indicia readers with programmable indicators of software upgrades.

BACKGROUND OF THE INVENTION

Indicia reading devices (also referred to as optical indicia readers, scanners, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

SUMMARY OF THE INVENTION

The invention comprises, in one form thereof, an indicia reader with a user perceptible indicator of a software upgrade comprising an imaging reader assembly, an electronics assembly, a housing, wherein one of the electronics assembly and the housing produces a user perceptible indicator in response to a software upgrade.

In still another form, the invention includes a method for providing a user perceptible indication of a software change affecting the capabilities of an indicia reader. The method comprises the steps of providing a first user perception of the indicia reader prior to the software change, providing a second user perception of the indicia reader after the software change, wherein the difference between the second user perception and the first user perception in response only from the software change.

BRIEF DESCRIPTION OF THE DRAWINGS

The aforementioned and other features, characteristics, advantages, and the invention in general will be better understood from the following more detailed description taken in conjunction with the accompanying drawings, in which.

It will be appreciated that for purposes of clarity and where deemed appropriate, reference numerals have been repeated in the figures to indicate corresponding features. Also, the relative size of various objects in the drawings has in some cases been distorted to more clearly show the invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art.

Figure 1:
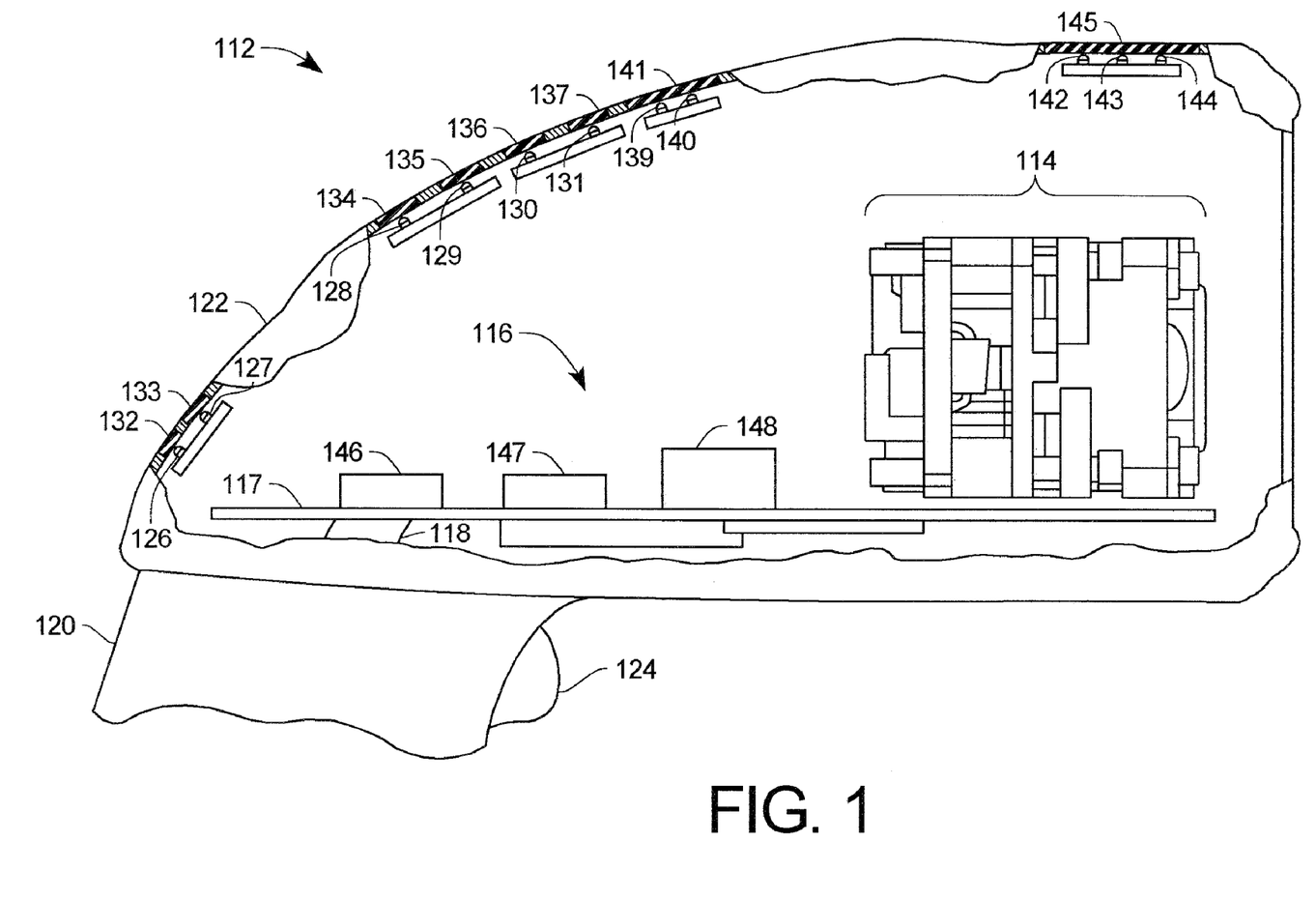
FIG. 1 is a partial cutaway view of an optical indicia reader in accordance with at least one embodiment of the present invention.

Referring to FIG. 1, an exemplary hand held indicia reading device or scanner 112 (referred to as "scanner 112") has a number of subsystems for capturing images and decoding dataforms within such images and for indicating to an operator the current capabilities of the scanner 112. The scanner 112 has an imaging reader assembly 114, an electronics assembly 116 including a printed circuit board 117, an inner cable 118 from the electronics assembly 116 to a connector (not shown) at the end of a handle 120, and a housing 122 which encloses the electrical parts and is connected to the handle 120. A trigger 124 may be used to activate and deactivate the scanner 112. The imaging reader assembly 114 may be of the type described in U.S. Patent Publication No. 2003/0029917 which is hereby incorporated by reference.

The housing 122 also includes 11 LEDs and 8 translucent windows. More specifically, LEDs 126, 127, 128, 129, 130, and 131 are positioned behind translucent windows 132, 133, 134, 135, 136, and 137, respectively; LEDs 139 and 140 are positioned behind translucent window 141; and LEDs 142, 143, and 144 are positioned behind translucent window 145.

The scanner 112 may also contain a sound generator 146, a motion detector 147, and/or a vibrator 148. The activating of the LEDs, the sound generator, and/or the vibrator change the appearance and/or feel of the scanner 112 so that an operator can easily recognize the functionality/capability of the scanner 112.

The scanner 112 has hardware for many different operating modes, and the same scanner 112 may be sold with basic functionality and later the scanner 112 and/or host processor software can be upgraded to provide different programmed configurations which determine, in part, the sales price of the installed software upgrades. The different programmed configurations may have different indicators on the housing 122 of the scanner 112 to indicate the programmed configuration. Thus, it is also possible to sell a scanner 112 with minimal capabilities and to offer the customer the option to enhance the capabilities of the scanner 112 by changing the software in the scanner 112 and/or a host system for the scanner 112.

Figure 2:
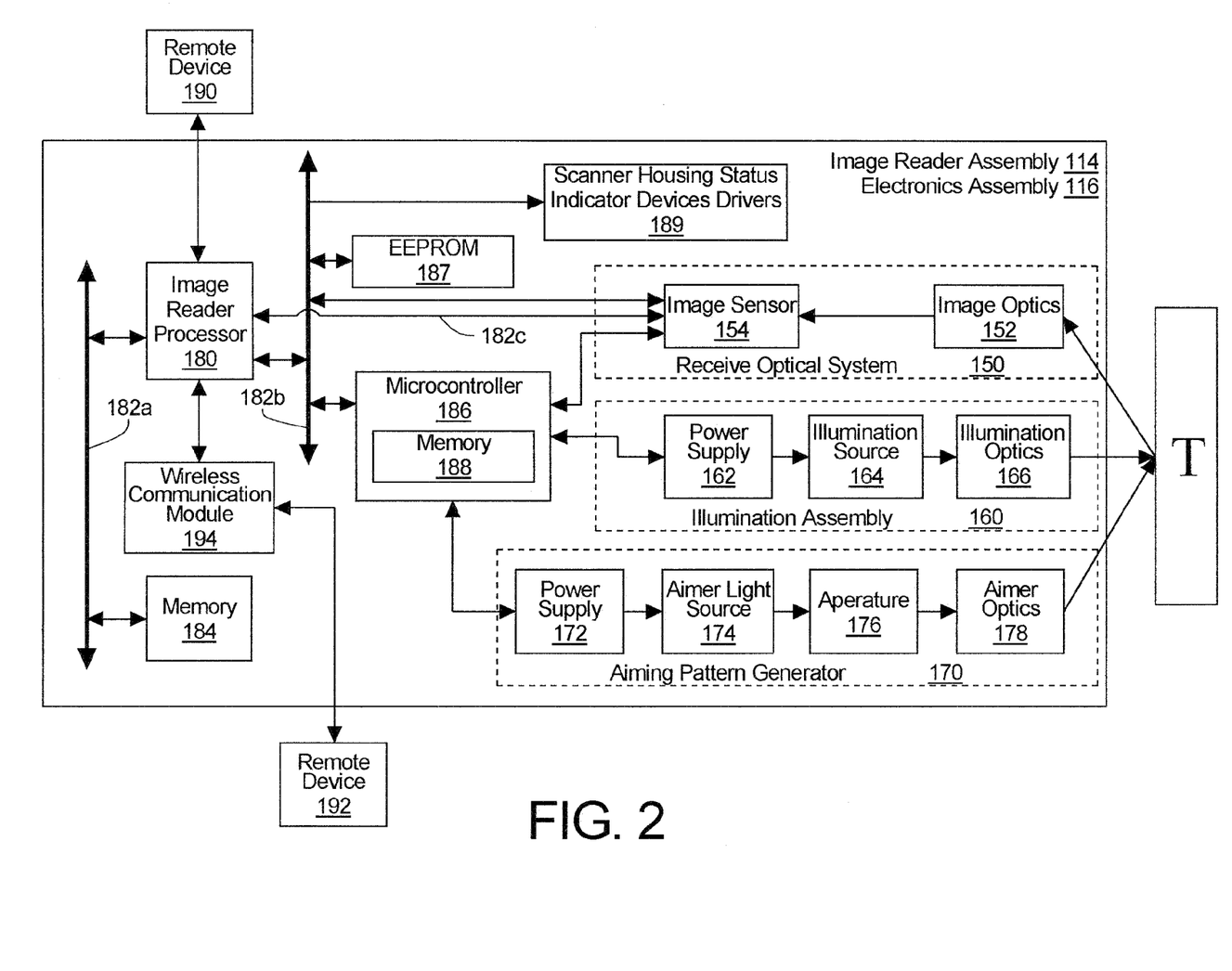
FIG. 2 is a block diagram of the optical indicia reader of FIG. 1.

Referring to FIG. 2, the image reader assembly 114 and electronics assembly 116 generally comprise a receive optical system 150, an illumination assembly 160, an aiming pattern generator 170, and a variety of control and communication modules. The receive optical system 150 generates frames of data containing indications of the intensity of light received by the read optical system 150. The illumination assembly 160 illuminates a target T creating reflections that are received by the receive optical system 150. The aiming pattern generator 170 projects an aiming light pattern to assist with aiming the scanner 112. While the present description employs an imager based data collection subsystem (the image reader assembly 114 and electronics assembly 116), it is to be recognized that the data collection subsystem may take other forms such as a laser scanner.

The receive optical system 150 generally comprises image receive optics 152 and an image sensor 154. The image optics 152 receives light reflected from a target T and projects the reflected light on to the image sensor 154. The image sensor 154 may comprise any one of a number of two-dimensional, color or monochrome solid state image sensors using such technologies as CCD. CMOS, NMOS, PMOS, CID, CMD, etc. One possible sensor is the MT9V022 sensor from Micron Technology Inc. Such sensors contain an array of light sensitive photodiodes (or pixels) that convert incident light energy into electric charges.

Many image sensors are employed in a full frame (or global) shutter operating mode, wherein the entire imager is reset prior to an image capture operation to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out. Image sensor 154 may also employ a rolling shutter.

The illumination assembly 160 generally comprises a power supply 162, an illumination source 164 and illumination optics 166. The illumination optics 166 directs the output of the illumination source 164 (generally comprising LEDs or the like) onto the target T. The light is reflected off the target T and received by the receive optical system 150. It is to be noted that the illumination provided by the illumination assembly 160 may be combined with (or replaced by) other sources of illumination, including ambient light from sources outside of the scanner 112.

The aiming pattern generator 170 generally comprises a power supply 172, an aimer light source 174, an aperture 176, and aimer optics 178. The aiming pattern generator 130 creates an aiming light pattern projected on or near the target which spans a portion of the receive optical system's 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc., figures, whether continuous or discontinuous, i.e., defined by sets of discrete dots, dashes, and the like. Alternately, the aimer pattern generator may be a laser pattern generator. The type of aiming pattern may be under software control and may be part of a software upgrade to thereby provide an indication of the upgrade to a user of the upgraded scanner 112.

Generally, the aimer light source 174 may comprise any light source which is sufficiently small or concise and bright to provide a desired illumination pattern at the target. For example, the aimer light source 174 may comprise one or more LEDs, such as part number NSPG300A made by Nichia Corporation. Illumination and aiming light sources with different colors and combination of colors may be employed, for example white, green and red LEDs. The colors may chosen based on the color of the symbols most commonly imaged by the image reader. Different colored LEDs may be each alternatively pulsed at a level in accordance with an overall power budget.

The aimer light sources 174 may also be comprised of one or more laser diodes such as those available from Rohm. In this case a laser collimation lens (not shown in these drawings) will focus the laser light to a spot generally forward of the scanning head and approximately at the plane of the target T. This beam may then be imaged through a diffractive interference pattern generating element, such as a holographic element fabricated with a desired pattern in mind. Examples of these types of elements are known, commercially available items and may be purchased, for example, from Digital Optics Corp. of Charlotte, N.C. among others.

An image reader processor 180 provides overall control of the image reader assembly 114 and electronics assembly 116. The image reader processor 180 and other components of the image reader assembly are generally connected by one or more buses 182n and/or dedicated communication lines. In the illustrated example a parallel bus 182a connects the image reader processor 180 to a main system memory 184 used to store processed (and unprocessed) image data from the image sensor 154. The image reader processor 180 utilizes an I²C bus 182b to communicate exposure settings to the image sensor 154 and illumination parameters to a microcontroller 186. A dedicated 8 to 10 bit parallel bus 182c is used to transfer image data from the image sensor 154 to the image reader processor 180. The width of the bus 182c may be dependant on the bit size recorded by each pixel in the image sensor 154. The output of the image sensor 154 is processed by the image reader processor 180 utilizing one or more functions or algorithms, which may be stored in an EEPROM 187, to condition the signal appropriately for use in further processing downstream, including being digitized to provide a digitized image of target T.

Another function of the image reader processor 180 is to decode machine readable symbology represented within an image captured by the image sensor 154. Information respecting various reference decode algorithms is available from various published standards, such as by the International Standards Organization ("ISO"). The image reader processor 180 also controls the scanner housing status indicator device drivers 189 which drives the LEDs 126-131, 139, 140, and 142-144, the vibrator 147, and the sound generator 146. The image reader processor 180 also receives output signals from the motion detector 148.

The microcontroller 186 maintains illumination parameters, used to control operation of the illumination assembly 160 and the aiming pattern generator 170, in a memory 188. For example, the memory 188 may contains tables indicative of power settings for the power supplies 162 and 172 corresponding to various states of the signal from the image sensor 154. Based upon signals from the image reader processor 180 and/or the image sensor 154, the microcontroller 186 sends signals to the power supplies 162 and 172 based on values stored in the table in memory 188. An exemplary microcontroller 160 is the CY8C24223A made by Cypress Semiconductor Corporation.

The image reader assembly 114 and electronics assembly 116 may be provided with one or more communication paths for communicating with remote devices 190 and 192, such as networks, network interfaces (e.g. routers hubs and switches), other scanners, data collection devices, computers, or data storage devices (e.g. hard drives). In general, such communications paths are either wired or wireless and may either be integrated with the image reader processor 180 or implemented as one or more separate modules. In the example illustrated in FIG. 2, a wired connection, such as UARTS, USB serial, parallel, scan wedge, or Ethernet, is shown as being integrated with the image reader processor 180. On the other hand, a wireless connection, such as IrDA, BLUETOOTH, GSM, GPRS, EDGE, and 802.11, is illustrated as being implemented via a wireless communication module 194.

Figure 3:
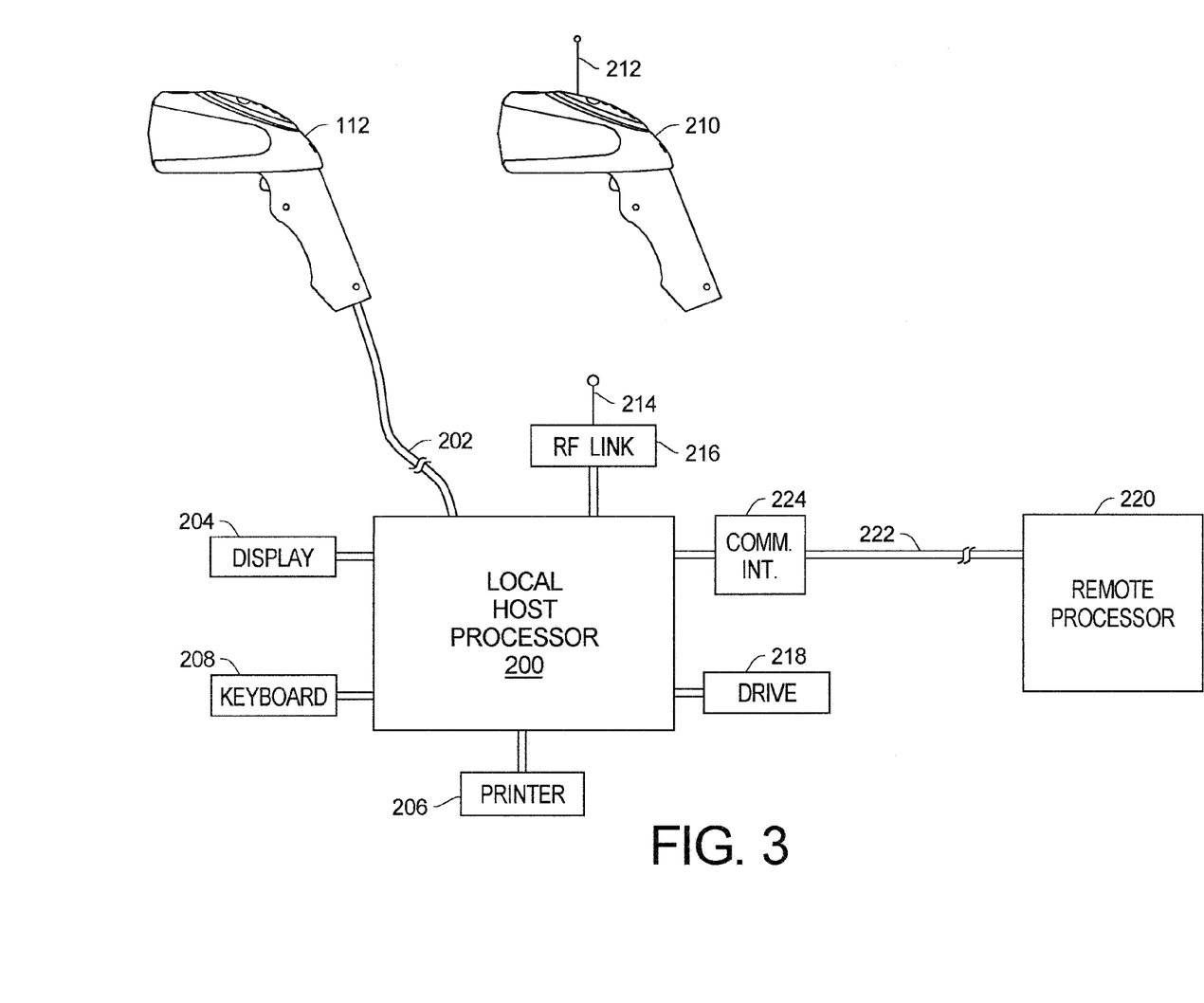
FIG. 3 is a block diagram of a typical system with which the reading device shown in FIG. 1 may be used.

FIG. 3 is a block diagram of a typical system with which the scanner 112 may be used. Shown in FIG. 3 is the scanner 112 coupled to a local host processor 200 by means an interconnect cable 202. Host processor 200 may be connected to a display 204, to a printer 206, and a keyboard 202, although the cable 202 may be equipped with a keyboard wedge to connect between the host processor 200 and the keyboard 208. The reader may also comprise a cordless battery powered reader 210 which is coupled to a host processor 200 via a suitable RF link including antennae 212 and 214 and an RF interface module 216. As used herein, the term "local host processor" will be understood to include both stand alone host processors and host processors which comprise only one part of a local computer system.

If the software for the scanner 112 is available locally as, for example, on a diskette or CD-ROM, it may be loaded using a suitable drive unit 218. The local host processor 200 may be in communication with a remotely located processor 220 through a suitable transmission link 222, such as an electrical conductor link, a fiber optic link, or a wireless transmission link through a suitable communication interface 224, such as a modem. As used herein, the term "transmission link" will be understood to refer broadly to any type of transmission facility, including an RS-232 capable telephone line, an RF link, or a computer network, e.g., ETHERNET although other types of transmission links or networks may also be used. For example, transmission link 222 could be provided by a coaxial cable or any other non-RF electromagnetic energy communication link including a light energy infrared or microwave communication link. Link 222 could also be an acoustic communications link.

Figure 4A:
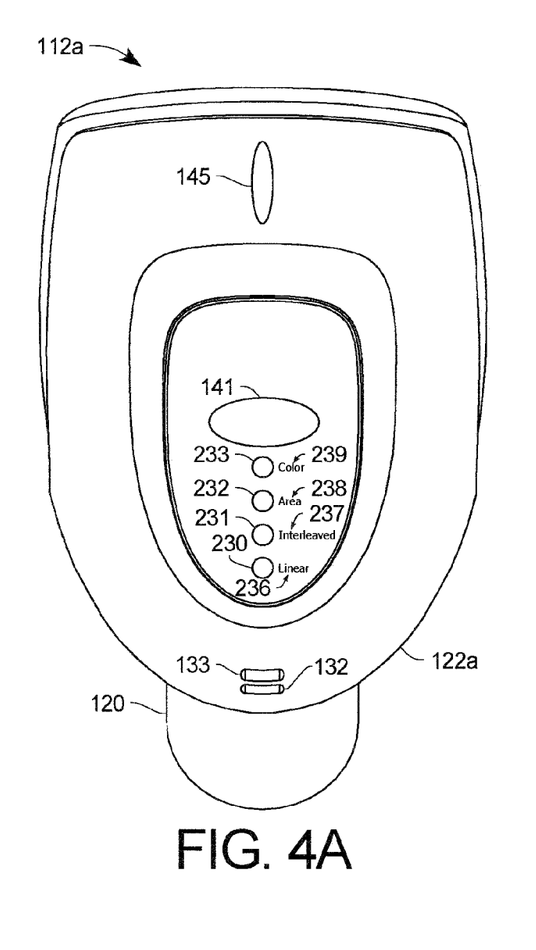
FIGS. 4A, 4B, 4C, 4D, and 4E are top views of embodiments of the present invention.
Figure 4B:
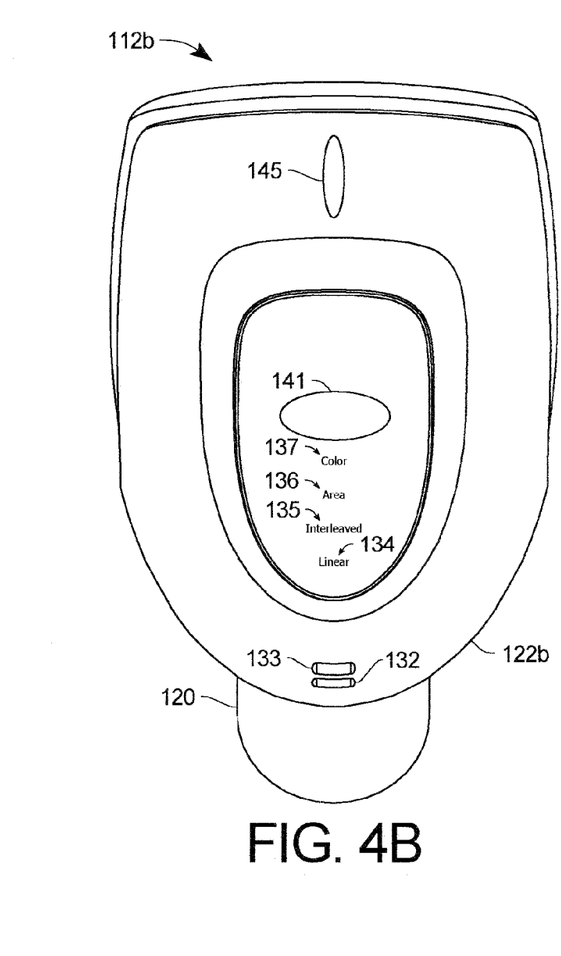
Figure 4C:
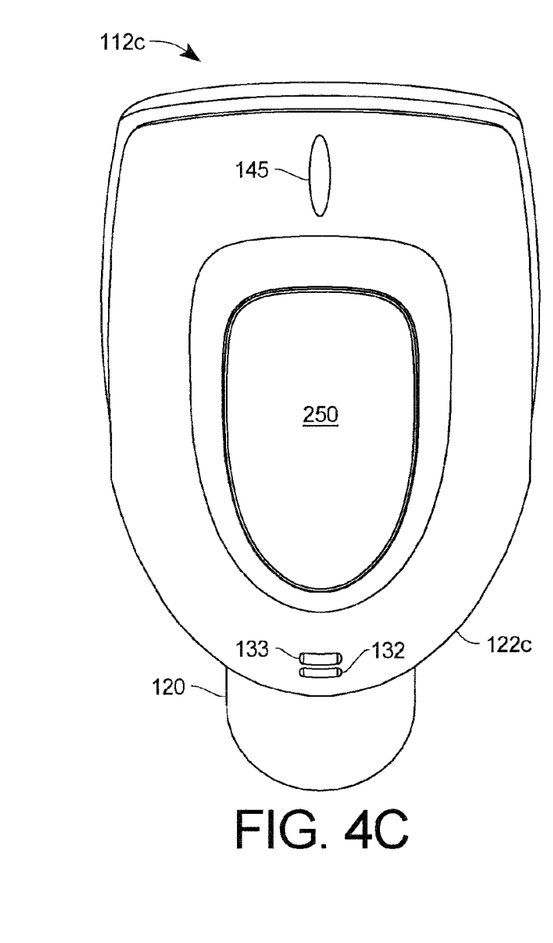
Figure 4D:
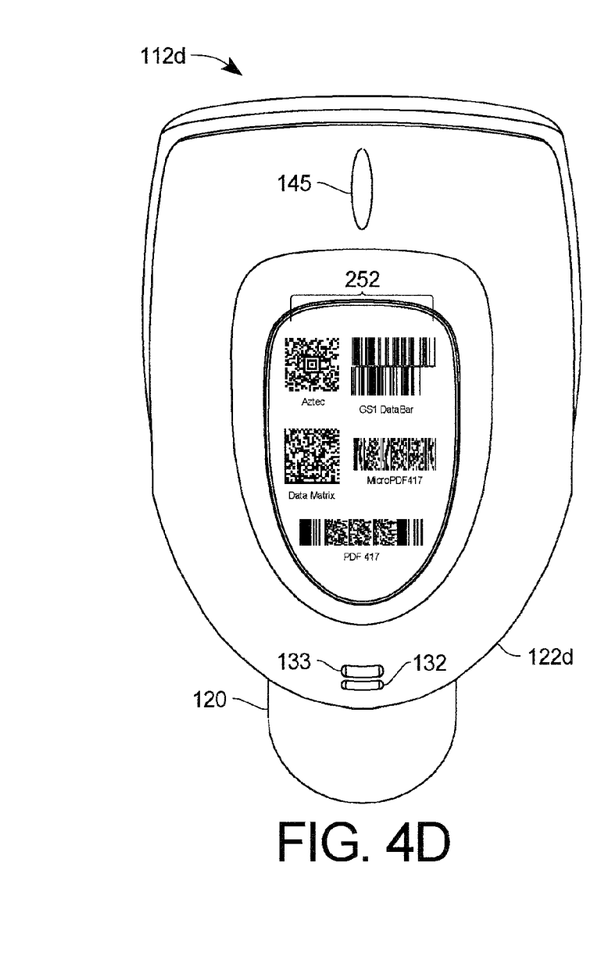
Figure 4E:
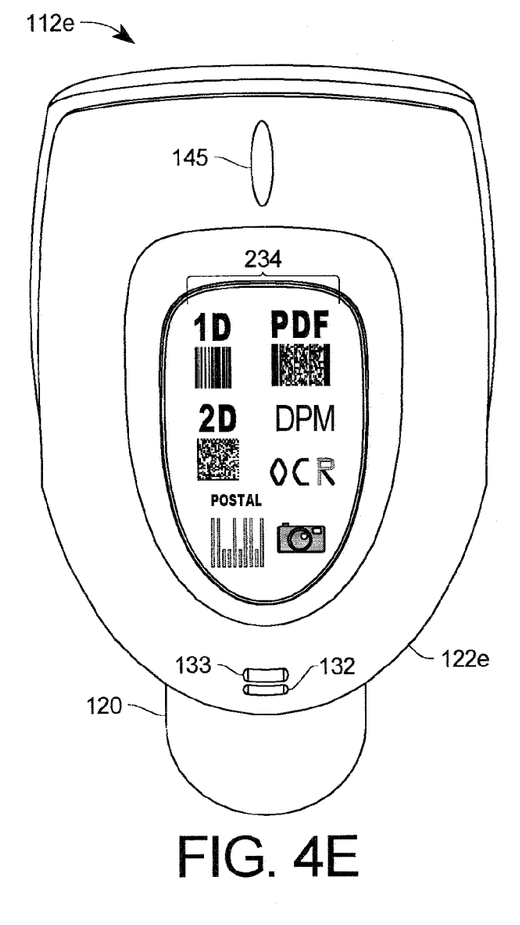

FIGS. 4A, 4B, 4C, 4D, and 4E are top views of embodiments of the present invention. In FIG. 4A the top of the housing 122a of the scanner 112a has a row of LEDs 230, 231, 232, and 233, which can be either visible, as shown in FIG. 4A, or invisible when a LED is not illuminated. Next to each of the LEDs 230-233 are printed labels 236, 237, 238, and 239, respectively, which indicate the upgrade status of the scanner 112a by the illumination, or lack of illumination, of the LEDs next to each of the labels. In FIG. 4B the LEDs are replaced by labels in the housing 122b which are part of the translucent windows 134-137, and which can be back illuminated if the corresponding capability of the scanner 112b has been programmed into the scanner 112b. In FIG. 4C the top panel of the housing 122c may have an electroluminescent display 250 which is not illuminated when the scanner 112c has not been upgraded, and which is illuminated if a particular capability has been programmed into the scanner 112c or host processor 190. FIGS. 4D and 4E show scanners 112d, 112e with housings 122d, 122e, respectively, with a plurality of individual icons 252 and 254, respectively, some with labels, such as the labels in the icons 252 and icons labeled "1D", "PDF", and "2D" in the icons 254. In FIG. 4E "DPM" signifies digital product marking barcodes, "OCR" signifies that the scanners 112e can read OCR printed labels, and a camera icon indicating that the scanner 112e can take full frame pictures. The scanner 112e in FIG. 4E may have the "1D" icon illuminated for any version of the scanner 112e.

With the indicators shown in FIGS. 4A-4E a user can quickly determine if a scanner 112 has the capability to perform the function that the user requires for a particular task, and also allows the end user to purchase a number of scanners 112 and upgrade them as required for the end user's business needs.

In addition to the visual indicators, other types of indications can be used to provide the user with the feeling that an upgraded scanner is different from the base scanner. Such indications can be changes in the sound emitted by the scanner 112 while it is being used, such as indicating not only if a barcode has been read successfully, but also providing a sound indication if the scanner 112 has detected a part of a bar code and can signal by different sounds what the scanner 112 believes is the problem in reading the barcode, such as the scanner is too close or too far away from the barcode. Another indication may be in the form of vibrations which a user can feel while using the scanner. The vibration can be used instead of an audio signal to indicate to the user that a successful read has been accomplished in a noisy environment, or indicate to the operator why the scanner 112 can't read the barcode. Another upgrade possibility could be motion detection which would detect when the scanner 112 is picked up, and then power the scanner for a predetermined period of time so that the operator does not have to press the trigger 124 to use the scanner 112.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. An indicia reader with a user perceptible indicator of a software upgrade comprising:
   a) an imaging reader assembly;
   b) an electronics assembly;
   c) a housing;
   wherein one of the electronics assembly and the housing produces a user perceptible indicator in response to a software upgrade.

2. The indicia reader of claim 1 wherein the software upgrade comprises a change in the software in the indicia reader.

3. The indicia reader of claim 1 wherein the software upgrade comprises a change in software in a computing device having a continuous or an intermittent connection to the indicia reader.

4. The indicia reader of claim 1 wherein the user perceptible indication is a user perceptible change in the appearance of the housing.

5. The indicia reader of claim 4 wherein the user perceptible change in the appearance of the housing is an illumination of a portion of the housing.

6. The indicia reader of claim 4 wherein the user perceptible change in the appearance of the housing is an illumination of an icon on the housing.

7. A process for providing a user perceptible indication of a software change affecting the capabilities of an indicia reader comprising the steps of:
   a) providing a first user perception of the indicia reader prior to the software change;
   b) providing a second user perception of the indicia reader after the software change;
   c) wherein the difference between the second user perception and the first user perception in response only from the software change.

8. The process of claim 7 wherein the difference comprises a difference in the visual perception of the indicia reader.

9. The process of claim 8 wherein the difference in visual perception is an additional illumination emanating from a housing of the indicia reader.

10. The process of claim 9 wherein the additional illumination provides an indication to a user of an additional capability of the indicia reader.

11. The process of claim 9 wherein the additional illumination is in the form of a pictorial.

12. The process of claim 7 wherein the difference comprises a difference in the sound produced by the indicia reader.

13. The process of claim 7 wherein the difference comprises a difference in the feel of the indicia reader.

14. The process of claim 7 wherein the difference comprises a difference in the operation of the indicia reader.

* * * * *